US010822024B2

(12) United States Patent
Pramod et al.

(10) Patent No.: US 10,822,024 B2
(45) Date of Patent: Nov. 3, 2020

(54) CURRENT SENSOR FAULT MITIGATION FOR STEERING SYSTEMS WITH PERMANENT MAGNET DC DRIVES

(71) Applicant: STEERING SOLUTIONS IP HOLDING CORPORATION, Saginaw, MI (US)

(72) Inventors: Prerit Pramod, Saginaw, MI (US); Rakesh Mitra, Saginaw, MI (US); Rangarajan Ramanujam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 320 days.

(21) Appl. No.: 15/804,281

(22) Filed: Nov. 6, 2017

(65) Prior Publication Data

US 2019/0135331 A1 May 9, 2019

(51) Int. Cl.
*B62D 5/04* (2006.01)
*H02P 7/285* (2016.01)
*H02P 29/032* (2016.01)

(52) U.S. Cl.
CPC ............ *B62D 5/049* (2013.01); *B62D 5/046* (2013.01); *B62D 5/0481* (2013.01); *H02P 7/285* (2013.01); *H02P 29/032* (2016.02); *H02P 2205/01* (2013.01)

(58) Field of Classification Search
CPC ...... B62D 5/049; B62D 5/0481; B62D 5/046; H02P 29/032; H02P 7/285; H02P 2205/01
See application file for complete search history.

(56) References Cited

U.S. PATENT DOCUMENTS

| | | | |
|---|---|---|---|
| 2009/0079373 A1* | 3/2009 | Nagase ................ | B62D 5/0487 318/400.22 |
| 2012/0235610 A1* | 9/2012 | Hisano ................. | H02P 29/032 318/400.04 |
| 2019/0023309 A1* | 1/2019 | Sasaki ...................... | H02P 6/16 |

* cited by examiner

*Primary Examiner* — Nga X Nguyen
(74) *Attorney, Agent, or Firm* — Dickinson Wright PLLC

(57) ABSTRACT

Technical solutions are described for current sensor fault mitigation for systems with permanent magnet DC drives. An example power steering system includes a brush motor, and a motor control system that generates an amount of torque using the brush motor, the amount of torque corresponding to a torque command. The motor control system includes a current sensor fault detector that detects a current sensor fault associated with a current sensor used to measure a current across the brush motor. The motor control system further includes a velocity observer that computes an estimated motor velocity in response to the current sensor fault. The motor control system further includes a feedforward controller that generates a current command for generating the amount of torque using the brush motor, the current command generated using the estimated motor velocity.

18 Claims, 10 Drawing Sheets

CURRENT SENSOR FAULT MITIGATION FOR STEERING SYSTEMS WITH PERMANENT MAGNET DC DRIVES

BACKGROUND

The present application relates to steering systems, particularly electric power steering (EPS) systems, and more particularly describes fault mitigation techniques for motor control in case of loss of current sensor in EPS using a Permanent Magnet DC drive.

Permanent Magnet DC (PMDC) motors are widely employed for motion control applications including EPS systems. The torque control of PMDC motor drives is performed through current regulation utilizing measured current feedback (through current measurement circuitry). Feedback current control performed in such a manner provides tunable current (and thus torque) control bandwidth characteristics, disturbance rejection, and reduced sensitivity to modeling uncertainty. Another advantage of using PMDC motor drives with feedback control operation is that position or velocity measurements are not required for control. It should be noted however that motor velocity is an important signal that enhances system control performance as it can be used for power limiting, compensator gain scheduling and other similar control features.

Feedforward current control of PMDC motor drives is another mode of operation that is typically used. This control mode requires an accurate model of the machine in which the PMDC motor is being used (for example, EPS), including nonlinearities (such as brush voltage drop). Typically, the feedforward current control has a technical challenge of low bandwidth (limited by sampling rate) and poor disturbance rejection performance characteristics. However, the feedforward current control mode is not prone to instabilities (due to open loop nature) and is inherently noise free because no current sensors are required. Feedforward control, unlike feedback current control, requires motor velocity for proper current control. While motor velocity may be measured using velocity sensors, or obtained by differentiating position signals measured by position sensors, it may also be estimated using state observers, and thus saving substantial costs.

However, observer based motor velocity estimation techniques use current sensors. Accordingly, it is desirable to have motor control systems to have fault tolerant current measurement strategies in case of a fault/loss of one or more current measurement sensors, or other equipment used for measuring the current values.

SUMMARY

Technical solutions are described for current sensor fault mitigation for systems with permanent magnet DC drives. An example power steering system includes a brush motor, and a motor control system that generates an amount of torque using the brush motor, the amount of torque corresponding to a torque command. The motor control system includes a current sensor fault detector that detects a current sensor fault associated with a current sensor used to measure a current across the brush motor. The motor control system further includes a velocity observer that computes an estimated motor velocity in response to the current sensor fault. The motor control system further includes a feedforward controller that generates a current command for generating the amount of torque using the brush motor, the current command generated using the estimated motor velocity.

These and other advantages and features will become more apparent from the following description taken in conjunction with the drawings.

One or more embodiments are described for a method for generating an amount of torque using a brush motor, the amount of torque corresponding to a torque command. The method includes detecting a current sensor fault associated with a current sensor used to measure a current across the brush motor. The method further includes computing, by a state observer, an estimated motor velocity in response to the current sensor fault. The method further includes generating, by a feedforward controller, a current command for generating the amount of torque using the brush motor, the current command generated using the estimated motor velocity.

Further, an example system includes a brush motor, and a motor control system that generates an amount of torque using the brush motor, the amount of torque corresponding to a torque command. The motor control system includes a feedback compensator that determines a feedback voltage to be applied across the brush motor for generating the amount of torque, the feedback voltage determined based on a current across the brush motor. Further, the motor control system includes a current sensor fault detector that detects a current sensor fault associated with a current sensor used to measure a current across the brush motor. Further, the motor control system includes a state observer configured to compute an estimated current across the brush motor in response to the current sensor fault, wherein the estimated current is sent to the feedback compensator for determining the feedback voltage in response to the current sensor fault.

Other aspects of the technical solutions are described herein which will be evident to a person skilled in the art.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
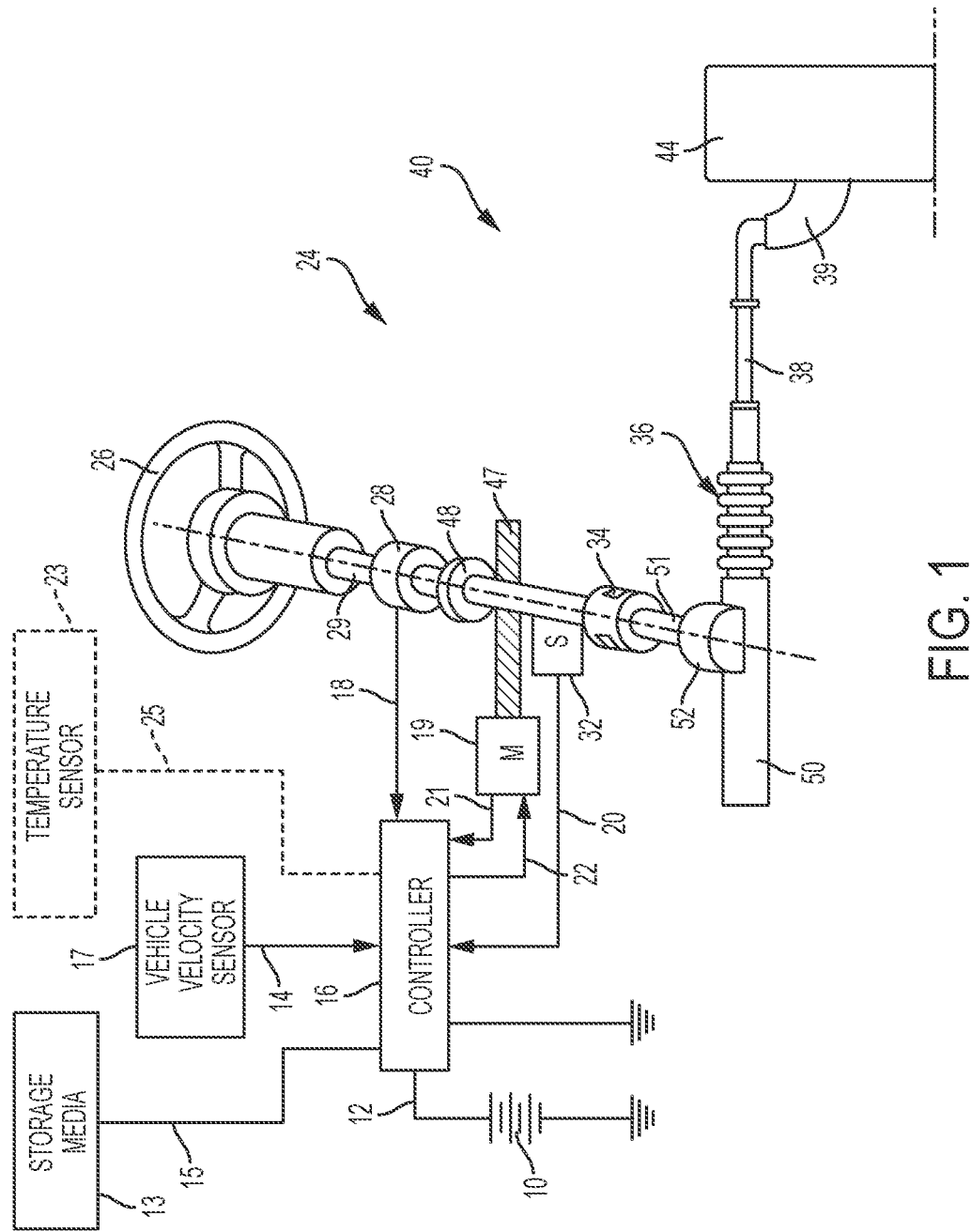
FIG. 1 depicts an EPS system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

The motor 19 is a PMDC motor. Motor torque and current control in the EPS system 12 with the PMDC motor 19 is typically performed using feedback control architectures utilizing current measurements. Current measurement faults are detected by including multiple sensors in the system that can be used for checking one another. When current measurement faults are detected, the motor control system goes into shutdown, which results in loss of assist to the driver. Thus, a technical challenge exists for adding fault tolerance into the EPS system 12 under sensor failures when using the PMDC motor 19.

Further, under a current sensor fault condition, the motor control loop output does not conform to the commanded torque. Thus, a further technical challenge is that at the instant of occurrence of the current sensor fault, EPS system behavior is to be managed to allow for smooth transition into the post-fault condition operation. Further, ensuring stable and satisfactory performance in the mitigation control mode is essential. The technical solutions described herein address these technical challenges of current sensor fault mitigation of PMDC drive based EPS systems.

Figure 2:
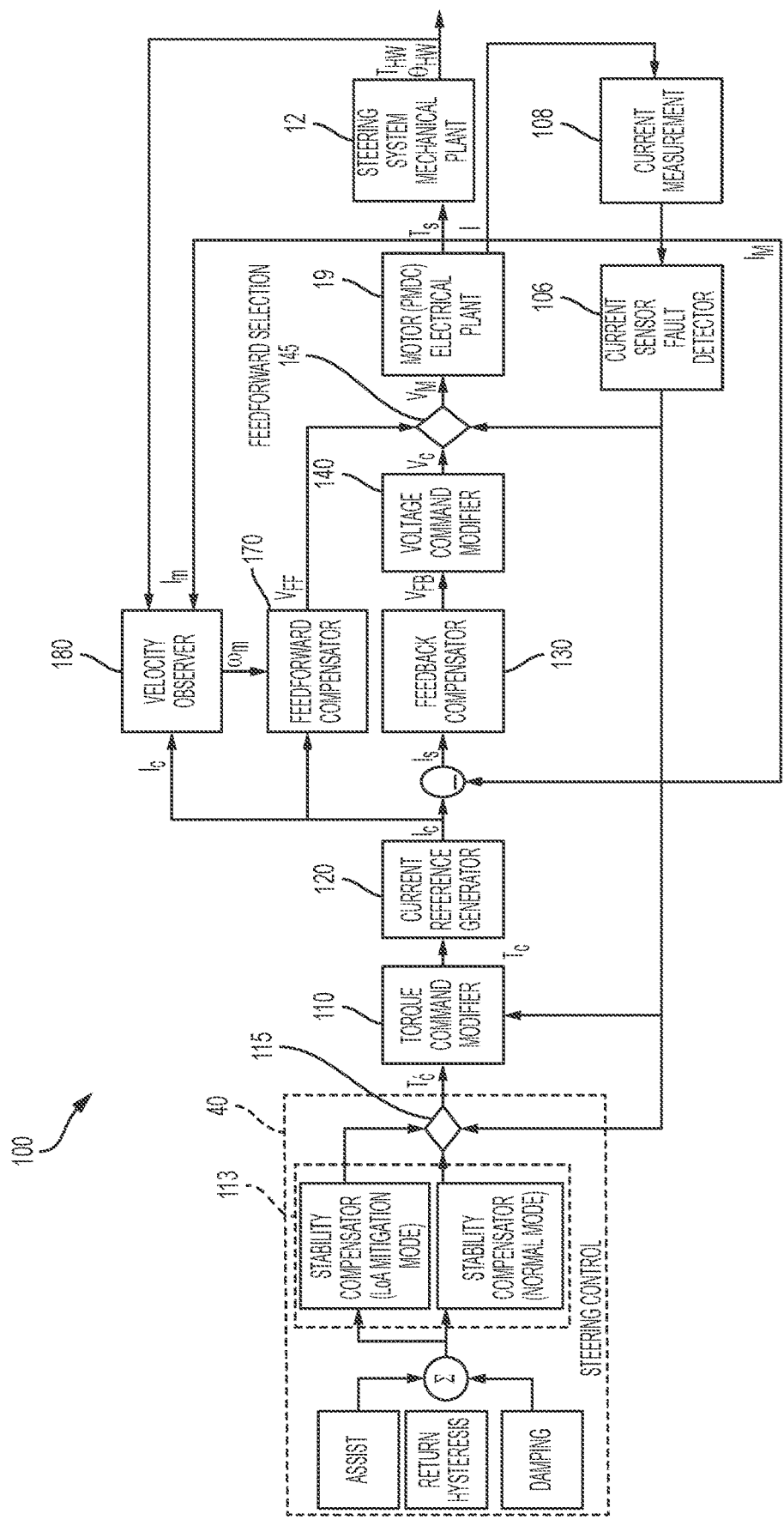
FIG. 2 depicts a block diagram of an example fault mitigation system for a steering system using a PMDC drive according to one or more embodiments.

FIG. 2 depicts a block diagram of an example fault mitigation system for a steering system using a PMDC drive according to one or more embodiments. The fault mitigation system 100 includes component modules such as, a torque command modifier 110, a current reference generator 120, a feedback compensator 130, a voltage command modifier 140, a PMDC motor electrical plant 19, a steering system mechanical plant 12, a current measurement 108, a current sensor fault detector 106, a feedforward compensator 170, a velocity observer 180, and the steering control module 40, among other components.

In one or more examples, the steering control module 40 includes a stability compensator module 113, a stability compensator selector module 115. A feedforward selection module 145 overrides the commands generated by the feedback current regulator (or feedback compensator) module 130 in the event a current sensor failure is detected. The feedforward selection module 145 selects a mode of the current regulator module 130 for the electric motor of the system, which is sent to the PMDC motor 19.

The feedforward selection module 145 enables a dynamic feedforward compensation in the event of a detection of a sensor failure. Further, any one or more of the torque command, current command and the voltage command sent to the electric motor of the system may be modified when the current sensor failure is detected. The motor current command may be generated by the current reference generator 120 in response to receiving the modified torque command $T_c$. The processing of the motor current command may change the voltage commands sent to the electric motor in response to the current sensor fault detection. Modifying the torque command automatically modifies the current command, and thus, the voltage command as well.

During a typical operation of the motor control system the torque command modifier 110 passes the input torque command $T_c'$ to the current reference generator 120, without any modification. The current reference generator 120 generates a corresponding current command $I_c$ corresponding to the torque command $T_c$ passed by the torque command modifier 110. In the feedback mode, the feedback compensator 130 applies a corresponding voltage command $V_{FB}$ to the motor 19 to cause the motor to generate the assist torque $T_e$. The assist torque $T_e$ is applied to the steering system 12.

The current measurement 108, which includes one or more current sensors, measure the output current from the motor 19. The current sensor fault detector 106, in one or more examples, detects a fault using a pair of current sensors, one being a redundant current sensor, and comparing the outputs of the two. Alternatively, or in addition, the current sensor fault detector 106 compares the measured current with an estimated current value based on the voltage command $V_{FB}$ (and/or the torque command $T'_c$, which in turn produces the current command $I_c$) using a mathematical model of the PMDC motor 19. The mathematical model consists of estimated motor parameters. If a difference between the estimated current and the measured current is above a predetermined threshold, the current sensor fault detector 106 notifies the one or more modules of the fault mitigation system 100 of the detected fault. It should be noted that other mechanisms used for detecting the current sensor fault may be used in other examples.

For example, in response to the detection of a current sensor fault by the current sensor fault detector module 106, the stability compensator selector module 115 may implement a loss of assist mitigation mode in the steering system by selecting a loss of assist mitigation mode output from the stability compensator module 113, and therefore generate a compensated torque command $T_c'$ that is sent to the torque command modifier module 110. The selection of the loss of assist mitigation mode output changes a function provided by the stability compensator module 113 upon the detection of the current sensor fault. The stability compensator module 113 may be tuned as a function of the motor current control implementation. For instance, the stability compensator is tuned differently when the motor current control system operates in the static (or dynamic) feedforward control configuration. This transition from the feedback current control configuration to the static (or dynamic) feedforward current control configuration occurs when the feedforward selection module 145 receives the enable command from the current sensor fault detector module 106.

The stability compensator module 113 is, in some embodiments, a notch filter that can be programmed with a plurality of states. During the change of the function of the stability compensator module 113 as controlled by the stability compensator selector module 115, state variables of the stability compensator module 113 may be re-initialized to zero values, and over time, transition to values that represent the actual state of the steering system 12.

For example, the torque command modifier 110 and the voltage command modifier 140 are notified, and they respectively modify the input torque command and voltage commands. Further, in one or more examples, the feedback compensator 130 is notified and shut down in case of the detected current sensor fault, and instead the feedforward compensator 170 is initiated to take over the control of the motor control system using feedforward control mode. The velocity observer 180 is also initiated, which computes the motor velocity $\omega_m$ based on either the current command $I_c$ from the current reference generator 120 (in the loss of assist mitigation mode) or a measured current $I_m$ (during normal operation with a feedback current regulator) and other control signals from the steering system 12, such as the handwheel position $\theta_{HW}$ and handwheel torque $T_{HW}$.

The torque command modifier 110 modifies a torque command $T_c'$ to $T_c$ during the detection of the current sensor fault to ensure smooth transition into post fault-mitigation operation. The input torque command is a command that is generated by the controller 40 to generate an assist torque from the motor 19 based on the handwheel torque applied by the operator to maneuver the vehicle 10, along with other control signals of the steering system 12. At the instant of occurrence of the current sensor fault, since the measured currents are incorrect, the current regulator (feedback compensator) 130 starts applying large voltage commands, potentially equal to the bridge voltage, and the actual currents are incorrect and do not conform to the commanded currents. Thus, both the torque and voltage commands are to be ramped down instantly (or at a substantially fast rate) till the mitigation mode control logic becomes active. This may be done through the torque command modifier 110 and the voltage command modifier 140 using predetermined timed ramps.

Figure 3:
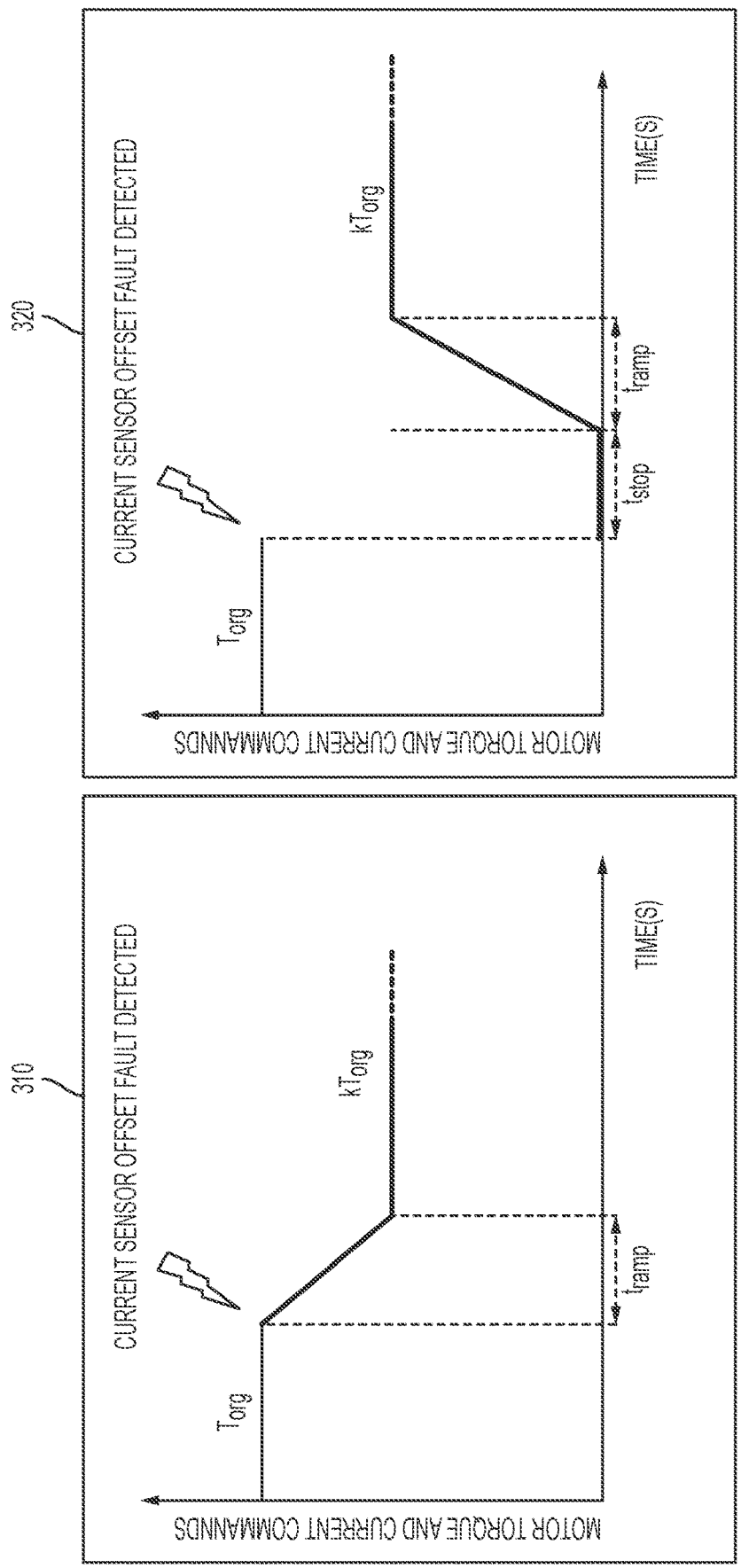
FIG. 3 depicts example ramp waveforms implemented by the torque command modifier according to one or more embodiments.

FIG. 3 depicts example ramp waveforms implemented by the torque command modifier according to one or more embodiments. For example, a first ramp waveform 310 as shown in FIG. 3 may be implemented by the torque command modifier 110, as described in more detail below, to decrease the input torque command during a time $t_{ramp}$ immediately after a fault detection. FIG. 3 illustrates a torque command change upon detection of a fault. When a fault is detected, the torque command modifier 110 may implement the ramp waveform 310 shown in FIG. 3 by reducing the torque command over a time period $t_{ramp}$. After the time period $t_{ramp}$, a modified torque command is reduced by a scale factor k to a magnitude of the product of scale factor k and $T_{org}$. The modified torque command may be output by the torque command modifier 110 as described in more detail below.

Alternatively, a second torque ramp return waveform 320 is illustrated in FIG. 3. In some cases, the torque error caused by the current measured error may exceed requirements related to maximum steering effort, so the torque command is set to zero immediately after the current sensor fault is detected. Accordingly, after the torque command is set to a zero value for a predetermined time period $t_{stop}$, and the torque command is increased over a time period $t_{ramp}$. The torque command may return to a steady-state value after the time period $t_{ramp}$. The modified torque command may be a function of the scale factor k and may be reduced by this scale factor in a steady state condition. The modified torque command may be reduced by a scale factor k as shown in plot 320 in FIG. 3.

It should be noted that FIG. 3 depicts two specific embodiments of torque ramp return waveforms, and that the torque command modifier 110 may implement any number of ramp return waveforms, and the subject application is not limited to the waveforms shown in FIG. 3. Further, other algorithms may be added to the torque command to avoid any disturbance the driver may feel during the transition period.

Figure 4:
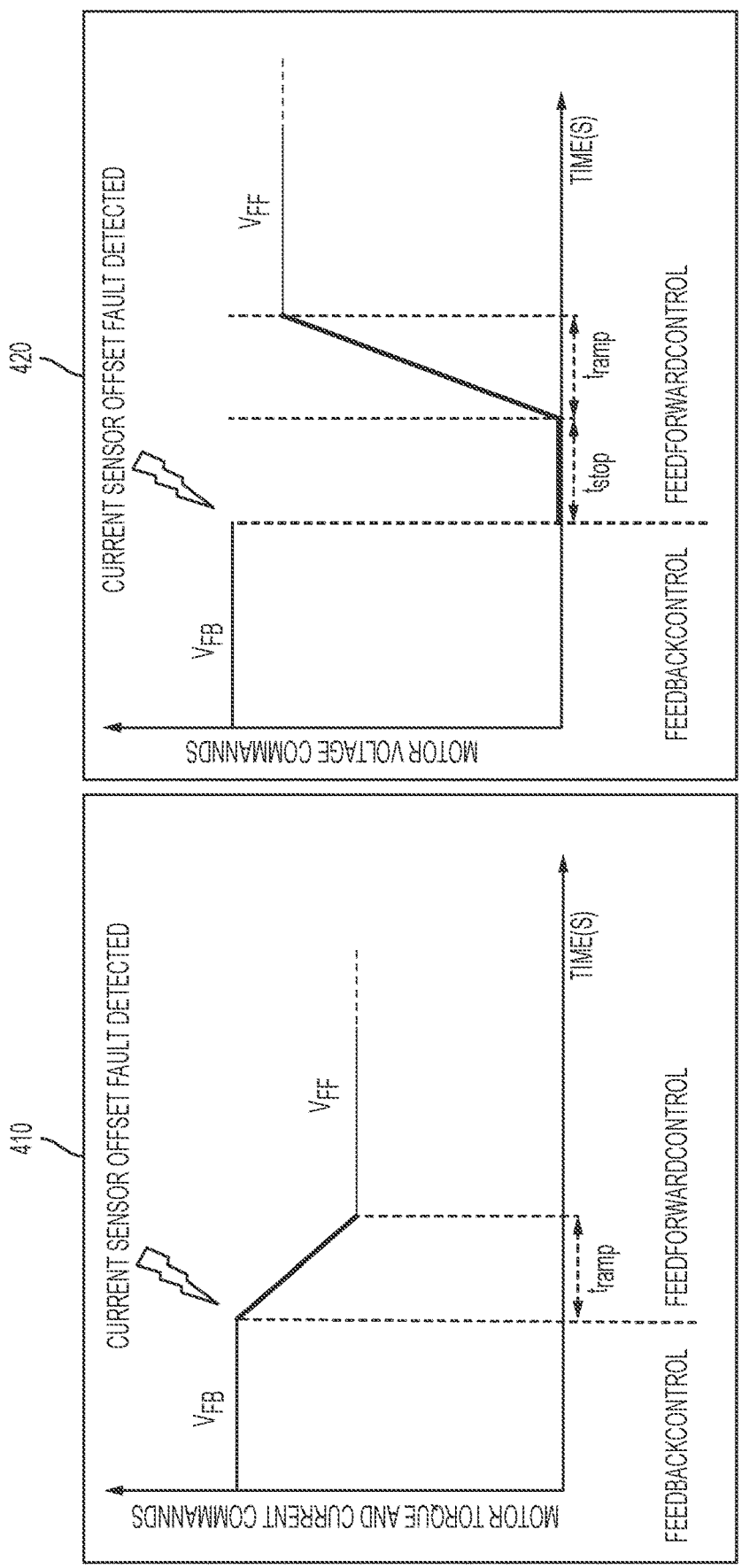
FIG. 4 depicts example transition management plots using voltage modification according to one or more embodiments.

FIG. 4 depicts example transition management plots using voltage modification according to one or more embodiments. For example, a first ramp waveform 410 as shown in FIG. 4 may be implemented by the voltage command modifier 140, as described in more detail below, to reduce the voltage across the motor control system to reduce the torque generated by the motor 19. When a fault is detected, the voltage command modifier 140 may implement the ramp waveform 410 shown in FIG. 4 by reducing the voltage command $V_{FB}$ over a time period $t_{ramp}$ to a voltage command $V_{FF}$. In one or more examples, after the time period $t_{ramp}$, the modified voltage command $V_{FF}$ is reduced by a scale factor k to a magnitude of the product of scale factor k and $V_{FB}$. The modified voltage command may be output by the voltage command modifier 140 as described in more detail below.

Alternatively, a second voltage ramp return waveform 420 is illustrated in FIG. 4. In this case, the voltage command is set to a zero value for a predetermined time period $t_{stop}$, and the voltage command is increased over a time period $t_{ramp}$ to the modified voltage command $V_{FF}$. The voltage command may return to a steady-state value after the time period $t_{ramp}$. The modified voltage command may be a function of the scale factor k and may be reduced by this scale factor in a steady state condition. The modified voltage command may be reduced, in comparison to the original voltage command $V_{FB}$ before the fault, by a scale factor k as shown in plot 420 in FIG. 4.

It should be noted that FIG. 4 depicts two specific embodiments of voltage ramp return waveforms, and that the voltage command modifier 140 may implement any number of ramp return waveforms, and the subject application is not limited to the waveforms shown in FIG. 4. Further, other algorithms may be added to the voltage command to avoid any disturbance the driver may feel during the transition period.

Further, the fault mitigation system 100 facilitates the steering system 12 to be kept in operation even under current sensor failures using one or more alternative control schemes for motor control. As described earlier, for PMDC machines, feedforward control uses back-EMF disturbance compensation value, which in-turn uses a motor velocity $\omega_m$ value. The technical solutions described herein facilitates this using the velocity observer 180 that does not require current measurement.

Figure 5:
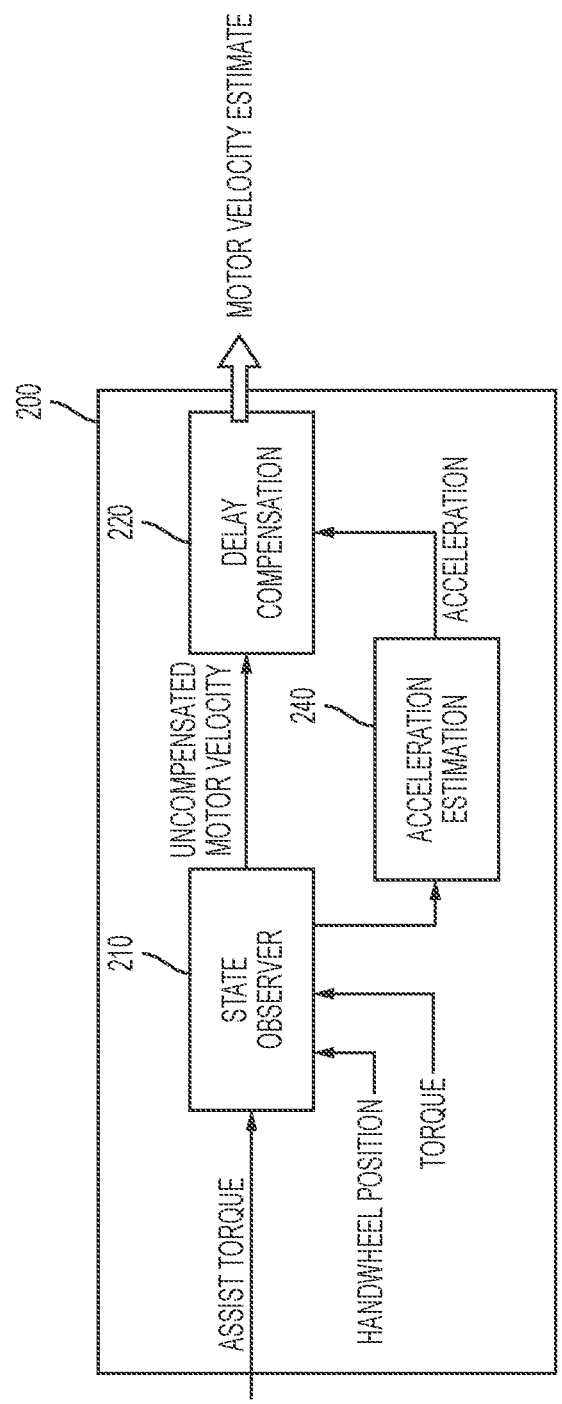
FIG. 5 illustrates a system for estimating the motor velocity of the motor of the steering system according to one or more embodiments.

FIG. 5 illustrates a system 200 for estimating the motor velocity of the motor 19 of the steering system 12 according to one or more embodiments. The system 200 includes, among other components, a state observer module 210, and a delay compensation module 220 that uses an acceleration estimate calculated using the acceleration estimation module 240.

The state observer module 210 determines a base (uncompensated) motor velocity estimate of the motor 19 of the EPS system 12 based on the EPS system plant model 12. The EPS system 12 may be modeled as a 2-mass system, a 3-mass system, or any other order mechanical model. The order of the model may affect accuracy of the estimated motor velocity determined by the observer module.

Figure 6:
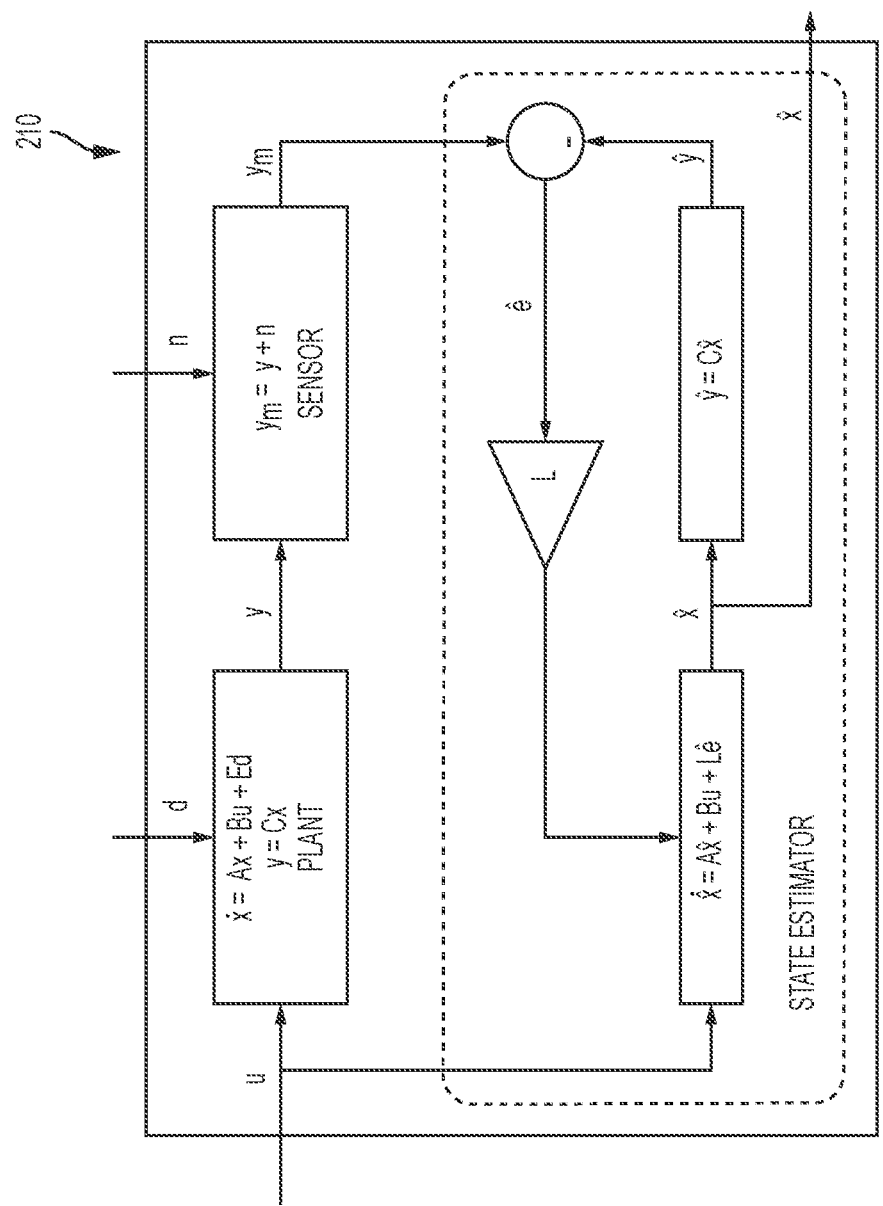
FIG. 6 depicts a structure and a dataflow for a state observer module according to one or more embodiments.

FIG. 6 depicts a structure and a dataflow for the state observer module 210 according to one or more embodiments. The state observer module 210 operates such that $\hat{x} = A\hat{x} + Bu + L(y - \hat{y})$, where L is an observer gain matrix with configurable parameters, and (y−9) represents an error ê, which is a difference between the output y from the motor and estimate 9 from the state observer module 210. The parameters in L are tuned using tuning techniques such as linear quadratic Gaussian (LQG), pole placement, and the like or a combination thereof. In other examples, as mentioned earlier, the state observer module 210 uses a reduced order computation, such as that for a 2-mass model, by removing one or more of the states that does not need to be estimated exclusively (i.e., a reduced order observer implementation) for estimating the motor velocity.

Thus, the state observer module 210 is a closed-loop observer that computes an estimate $\hat{x}(k)$ at each time k of the state x(k), by measuring the output y(k) and input u(k). For example, the state observer module 210 employs the observer gain matrix L such that on receiving successive measured values of the plant's inputs and outputs, the model's state converges to that of the plant (that is, magnitude of ê is below a predetermined threshold such as 0.1, 0.001, or the like; substantially 0). For example, the output of the state observer module 210 ŷ is subtracted from the output y of the plant and then multiplied by the gain matrix L. The result is then added to compute the estimate $\hat{x}$.

The estimated output from the state observer module 210 includes a lag. The delay compensation module 220 facilitates reducing, if not eliminating, the lag introduced by the processing in the state observer module 210. For example, a prediction term is added to the observed velocity to improve the phase lag. The velocity is related to acceleration (which is an indirect output of the state observer module 210) as shown below.

$$\alpha_m(s) = s\omega_m(s)$$

The delay compensation module 220 uses the acceleration value in discrete time to compensate the delay. In one or more examples, as illustrated in FIG. 2, the delay compensation module 220 receives the uncompensated estimated velocity from the state observer module 210 and computes a delay compensated velocity estimate. For example, the delay compensated estimate is computed as shown below.

$$\omega'_m[n] = \omega_{mb}[n] + T_{pred}\alpha_m[n]$$

Here, $T_{pred}$ is the amount of the dynamic time-delay that needs to be compensated. In the example above, the computation is based on a derivative approximation $$s = \frac{1 - z^{-1}}{T_s}$$

for the acceleration α. In other examples, a different approximation may be used for computing the acceleration, resulting in the computation of the delay compensated velocity estimate to be different than above expression.

The system 200 using the technical solutions described herein facilitates estimating the motor velocity, without using measured current from the motor 19.

In the depicted example in FIG. 5, the state observer 210 uses, as input, the torque $T_e$ generated by the motor 19 to estimate the motor velocity. In one or more examples, instead of using the output torque $T_e$ as an input for the state observer 210, the torque command $T_c$ is used with an the underlying assumption is that $T_c \approx T_e$, which emanates from the assumption of sufficiently high bandwidth of the feedforward current control loop, which may be achieved by appropriate tuning of the feedforward compensator 170.

Figure 7:
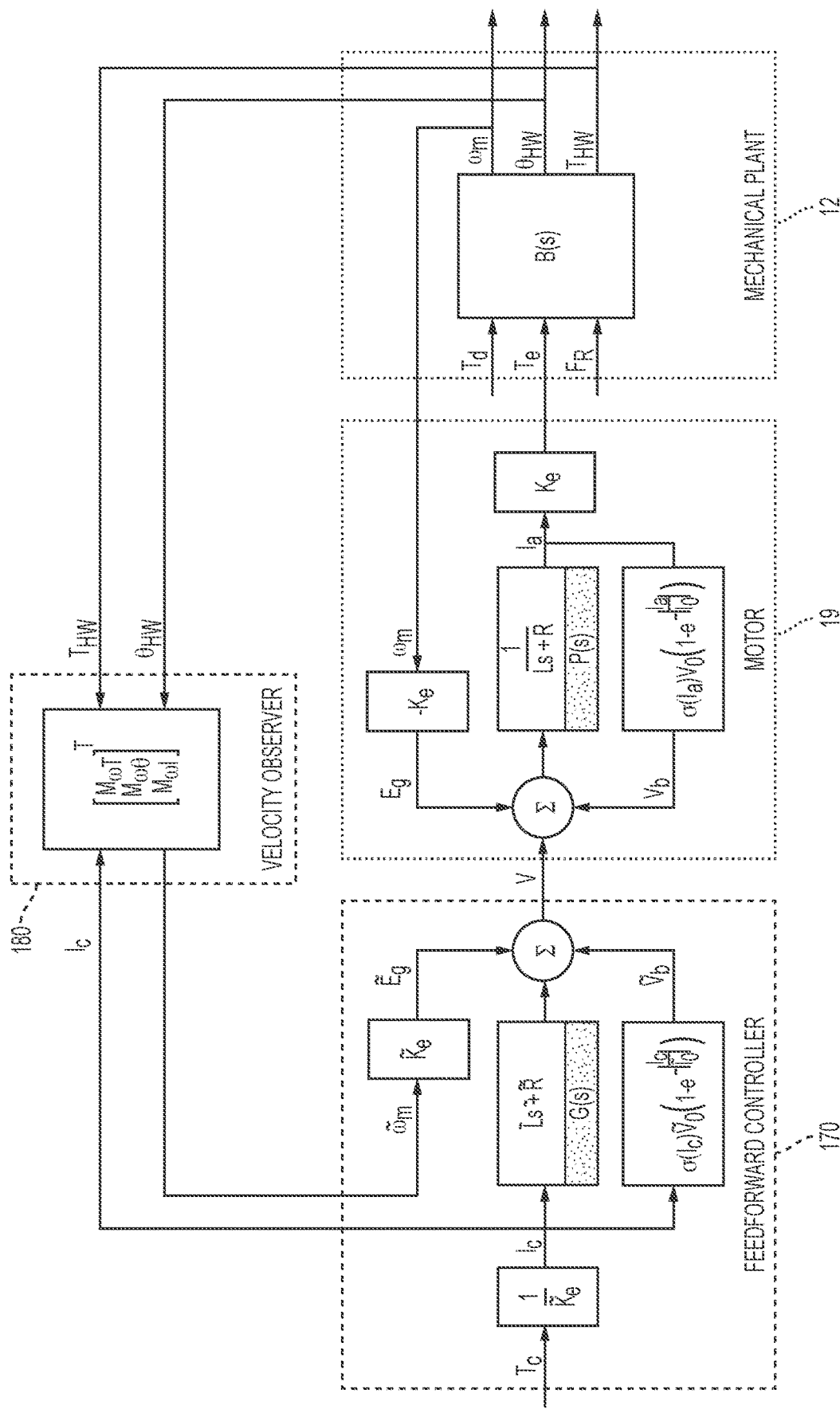
FIG. 7 depicts a block diagram depicting an operation of a feedforward current control system for current sensor loss of assist mitigation with EPS mechanical model based velocity observer using torque command according to one or more embodiments.

FIG. 7 depicts a block diagram depicting an operation of a feedforward current control for current sensor loss of assist mitigation with EPS mechanical model based velocity observer using torque command according to one or more embodiments. Here, instead of the aforementioned implementation based on the assumption of $T_c \approx T_e$, the velocity observer 180 uses the dynamics of the feedforward controller (also called feedforward compensator) 170, according to the commanded current $I_c$ or commanded torque $T_c$. The velocity observer 180 may utilize either the currents (actual or commanded) instead of torques, because the currents and torques are related by a predetermined voltage or torque constant. FIG. 7 shows the use of current instead of torque being used for the velocity observer 180 implementation, but in other examples, torque may be used.

Further, in one or more examples, the mechanical plant 12 is a 3-mass plant model of the EPS system 12, which may be described by the following mathematical expressions in continuous time.

$$\dot{x} = Ax + Bu + Ed$$

$$y = Cx$$

where x is a state vector including values of the current state of the EPS system 12, u is an input vector including measurable (and controllable) inputs to the EPS system 12, and d is a disturbance vector including measurable values that are not controllable, and typically non-linear in nature. Further, y is an output vector that is based on the current state x of the EPS system 12. A, B, C, and E, are configurable matrices which are setup to model the motor 19 of the EPS system 12. In one or more examples, the matrices may be preconfigured. Because the plant's current outputs and its future state are both determined based on the current states and the current inputs, the output of the plant, y(k) is used to steer the state of the velocity observer module 180. It should be noted that the implementation of the velocity observer module 180 is according to the state observer module 210 described herein.

The steering system plant 12 receives a driver torque $T_d$, an assist torque $T_a$, and a rack force or equivalent rack torque $T_r$. The driver torque represents the force applied by the operator/driver of the vehicle 10 on the handwheel 14 to steer the vehicle 10. The assist torque represents the driver assist torque provided by the EPS system 12 to assist the driver to steer the vehicle 10. The rack torque represents forces, including the friction and road forces, experienced by the rack and pinion of the EPS system 12 as the vehicle 10 is operating; for example, friction from the wheels 28 and 30 contacting a road surface etc.

Accordingly, in case of the 3-mass plant model 12, the system 200 uses the current command $I_c$ as the system input u, a torsion bar $T_{bar}$ as disturbances d, and a handwheel angle $\theta_{hw}$ as a part of the measured state x. As illustrated in FIG. 7, the velocity observer module 180 computes and subsequently outputs the estimated base motor velocity estimate using the a 3-mass model of the steering system mechanical plant 12 to the feedforward compensator 170 to control the motor 19.

Alternatively, or in addition, the torque command may be used along with predetermined constants such as the motor back-EMF (BEMF) constant $K_e$ to estimate the motor velocity. Thus, the input may be $u = [T_c]$.

The disturbance vector includes the driver torque and rack torque, i.e., $d = [T_d T_r]'$. Further, $x = [\theta_{HW}\ \omega_{HW}\ \theta_{AM}\ \omega_{AM}\ \theta_m\ \omega_m]'$ is the state vector consisting of the position and velocity of the handwheel 14. The parameters in the matrices A, B, C, and D, include inertia (J), damping (K), and stiffness (b) of the handwheel 14, assist subsystem 18, and the motor 19. Accordingly, the mathematical expressions above can be expressed as $$\begin{bmatrix} \dot\theta_{HW} \\ \dot\omega_{HW} \\ \dot\theta_{AM} \\ \dot\omega_{AM} \\ \dot\theta_m \\ \dot\omega_m \end{bmatrix} = \begin{bmatrix} 0 & 1 & 0 & 0 & 0 & 0 \\ -\dfrac{K_C}{J_{HW}} & -\dfrac{b_C+b_{HW}}{J_{HW}} & \dfrac{K_C}{J_{HW}} & \dfrac{b_c}{J_{HW}} & 0 & 0 \\ 0 & 0 & 0 & 1 & 0 & 0 \\ \dfrac{K_C}{J_{AM}} & \dfrac{b_c}{J_{AM}} & -\dfrac{K_C+K_{coup}+K_L}{J_{AM}} & -\dfrac{b_{AM}+b_{coup}}{J_{AM}} & \dfrac{K_{coup}}{J_{AM}} & \dfrac{b_{coup}}{J_{AM}} \\ 0 & 0 & 0 & 0 & 0 & 1 \\ 0 & 0 & \dfrac{K_{coup}}{J_m} & \dfrac{b_{coup}}{J_m} & -\dfrac{K_{coup}}{J_m} & -\dfrac{b_{coup}+b_m}{J_m} \end{bmatrix}$$

$$\begin{bmatrix} \theta_{HW} \\ \omega_{HW} \\ \theta_{AM} \\ \omega_{AM} \\ \theta_m \\ \omega_m \end{bmatrix} + \begin{bmatrix} 0 \\ 0 \\ 0 \\ 0 \\ 0 \\ \dfrac{1}{J_m} \end{bmatrix}[T_c] + \begin{bmatrix} 0 & 0 \\ \dfrac{1}{J_{HW}} & 0 \\ 0 & 0 \\ 0 & \dfrac{1}{J_{AM}} \\ 0 & 0 \\ 0 & 0 \end{bmatrix}\begin{bmatrix} T_d \\ T_r \end{bmatrix}$$

$$[T_{bar}] = \begin{bmatrix} -K_C & 0 & K_C & 0 & 0 & 0 \end{bmatrix} \begin{bmatrix} \theta_{HW} \\ \theta_{HW} \\ \theta_{AM} \\ \omega_{AM} \\ \theta_m \\ \omega_m \end{bmatrix}$$

In one or more examples, in case the velocity observer module 180 operates in a reduced order mechanical model of the EPS system 12, such as a 2-mass model, the technical solutions herein eliminate the measured states from the computations described earlier. In this case, the handwheel position is the measured state. For example, the velocity observer module 180 only receives the system inputs and the measured outputs and measured states and outputs the base (uncompensated) motor velocity estimate. In addition, the handwheel velocity may be obtained directly by differentiating handwheel position. Thus, two states (or one only if so desired) may be removed, leading to the state observer module 210 with lower complexity, which facilitates implementation, however at possibly lower accuracy.

Figure 8:
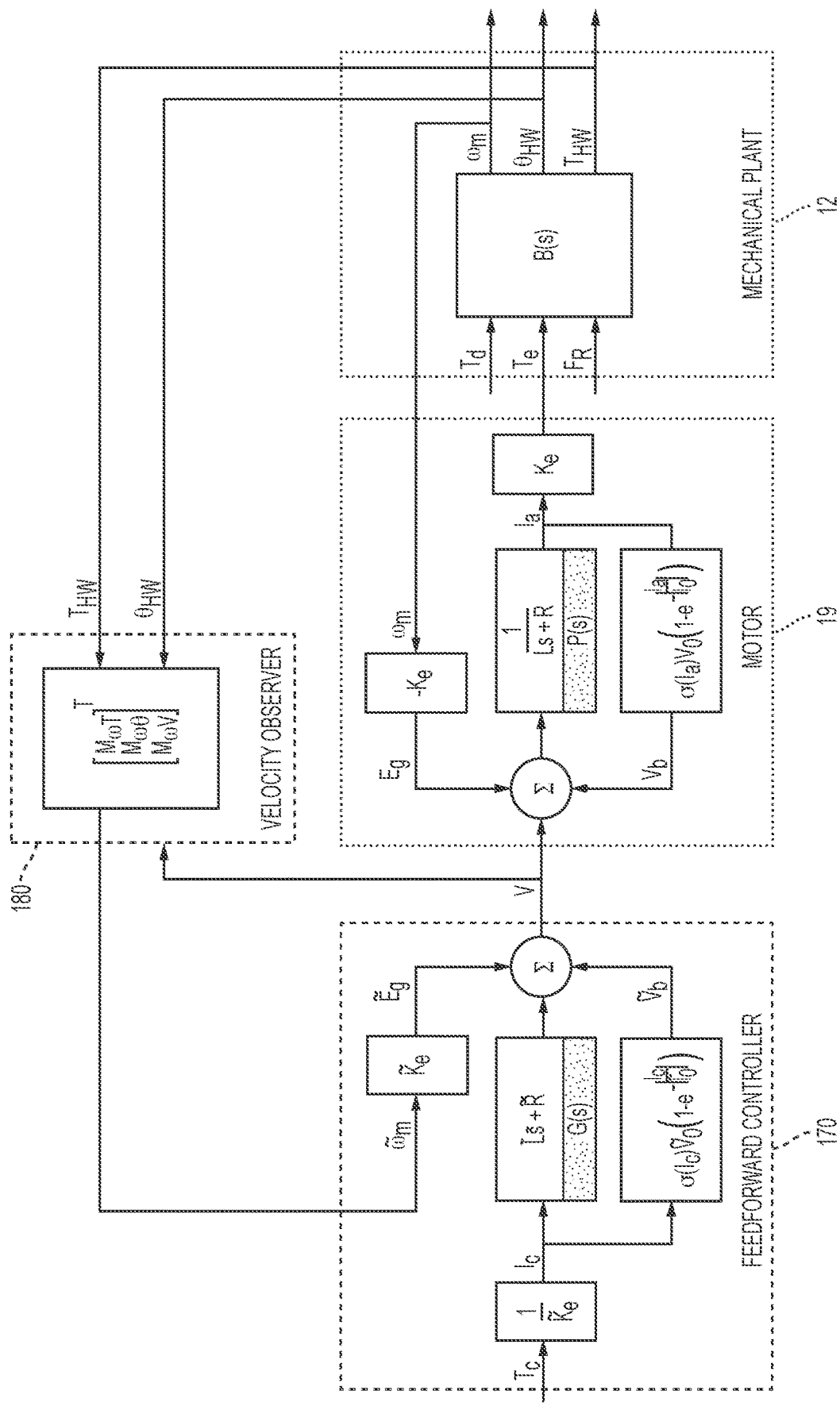
FIG. 8 depicts a block diagram for an operation of a feedforward current control system for current sensor loss of assist mitigation with composite plant model based velocity observer according to one or more embodiments.

FIG. 8 depicts a block diagram for an operation of a feedforward current control for current sensor loss of assist mitigation with composite plant model based velocity observer according to one or more embodiments. Compared to the current control operation in FIG. 7, the feedforward current control of FIG. 8 uses a composite plant model, in which the motor current is used as an additional state of the system, and the control signal is the motor voltage command (V). The state space description of the velocity observer 180 in this case is given below.

$$\dot{\hat{x}}_c = A_c \hat{x}_c + u_c u_c + L_c(y_c - C_c \hat{x}_c)$$

where the state, input and output vectors are $$\hat{x}_c = [\theta_{HW} \omega_{HW} \theta_{AM} \omega_{AM} \theta_m \omega_m I]^T,\ u_c = V,\ y_b = [T_{HW} \theta_{HW}]^T$$

The tuning of the observer gain matrix $L_c$ may be performed using techniques such as pole placement or any of the optimal control techniques. The remaining observer matrices are constructed using estimated parameters in the plant model as shown below.

$$A_c = \begin{bmatrix} 0 & 1 & 0 & 0 & 0 & 0 & 0 \\ -\dfrac{K_C}{J_{HW}} & -\dfrac{b_C+b_{HW}}{J_{HW}} & \dfrac{K_C}{J_{HW}} & \dfrac{b_c}{J_{HW}} & 0 & 0 & 0 \\ 0 & 0 & 0 & 1 & 0 & 0 & 0 \\ \dfrac{K_C}{J_{AM}} & \dfrac{b_c}{J_{AM}} & -\dfrac{K_C+K_{coup}+K_L}{J_{AM}} & -\dfrac{b_{AM}+b_{coup}}{J_{AM}} & \dfrac{K_{coup}}{J_{AM}} & \dfrac{b_{coup}}{J_{AM}} & 0 \\ 0 & 0 & 0 & 0 & 0 & 1 & 0 \\ 0 & 0 & \dfrac{K_{coup}}{J_m} & \dfrac{b_{coup}}{J_m} & -\dfrac{K_{coup}}{J_m} & -\dfrac{b_{coup}+b_m}{J_m} & \dfrac{K_e}{J_m} \\ 0 & 0 & 0 & 0 & 0 & -\dfrac{K_e}{L} & -\dfrac{R}{L} \end{bmatrix}$$

$$B_c = \begin{bmatrix} 0 & 0 & 0 & 0 & 0 & 0 & \frac{1}{L} \end{bmatrix}^T$$

$$C_c = \begin{bmatrix} -K_C & 0 & K_C & 0 & 0 & 0 & 0 \\ 1 & 0 & 0 & 0 & 0 & 0 & 0 \end{bmatrix}$$

where all the parameters are estimates of the actual parameters of the electrical and mechanical subsystems.

The state space representation can be converted to transfer matrix form by taking the Laplace transform as shown below.

$$\hat{X}_c = (sJ_c - A_c + L_c C_c)^{-1} B_c U_c + (sJ_c - A_c + L_c C_c)^{-1} L_c Y_c$$

Thus, the velocity estimate may be expressed as $$\hat{\omega}_m = [M_{\omega T} M_{\omega \theta} M_{\omega V}][T_{HW} \theta_{HW} V]^T$$

where Jc is the identity matrix. It is understood that while the observer matrices include the complete 3-mass mechanical plant model, a simpler model such as a 2-mass or 1-mass model may also be used instead. Also, a reduced order observer implementation can also be used, in other examples.

Further, the velocity observer 180 may be used to estimate the (Ia) motor current. Depending on the implementation, the estimated motor current may have sufficiently high bandwidth for it to be used for feedback control via current regulation. This structure serves as an alternative post-fault control strategy since no current measurements are required.

Figure 9:
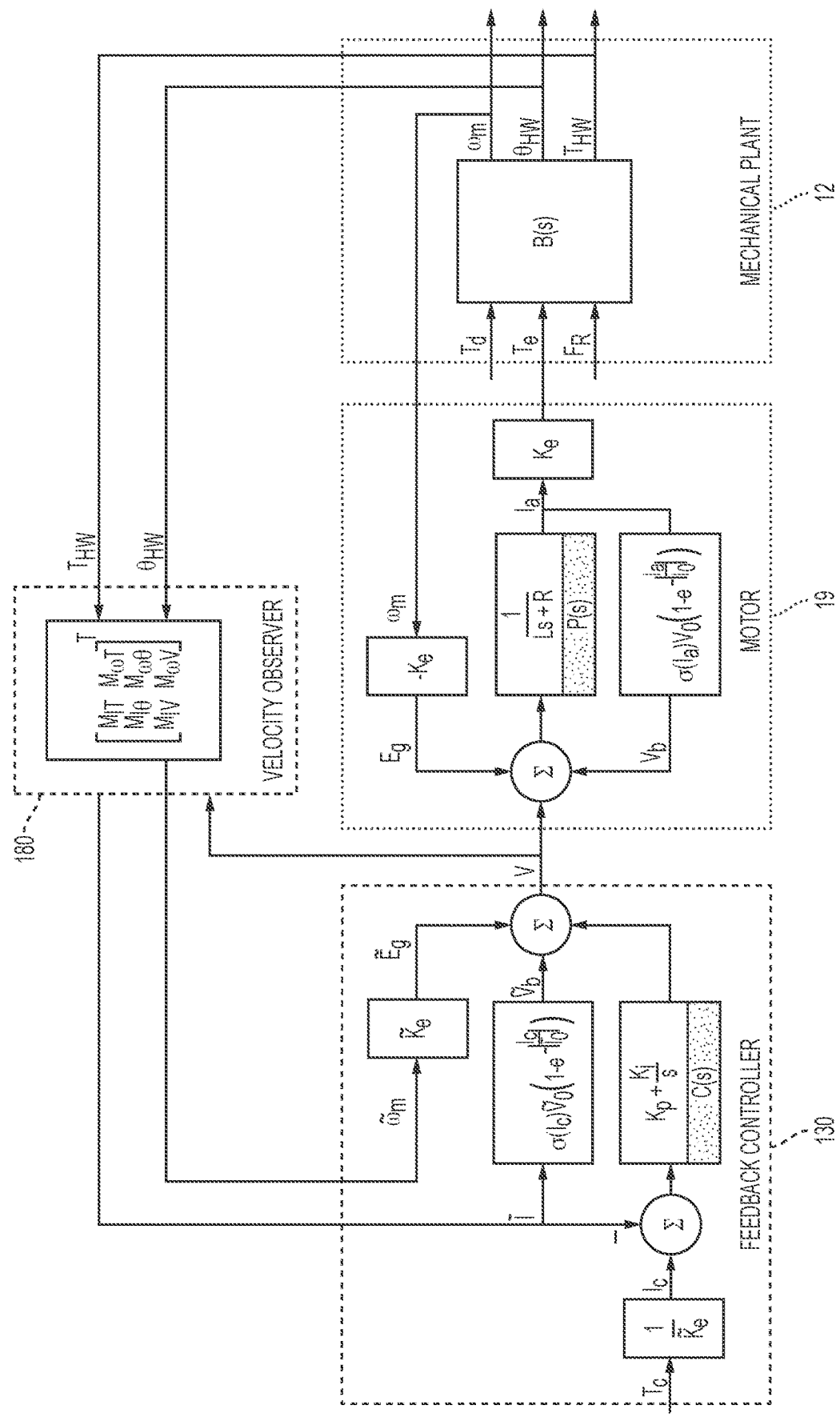
FIG. 9 depicts a block diagram of a fault mitigation control mode using the observer to estimate motor current according to one or more embodiments.

FIG. 9 depicts a block diagram of a fault mitigation control mode using the observer to estimate motor current (in addition to the motor velocity) according to one or more embodiments. Here using the computations described above, the feedback control implementation uses feedback current regulation utilizing estimated currents from the aforementioned observer structures, along with back-EMF disturbance and brush drop compensation. It should be noted that in one or more examples, the brush drop and back-EMF compensation may not be used for control implementation, since feedback current control may have sufficient disturbance rejection properties.

Figure 10:
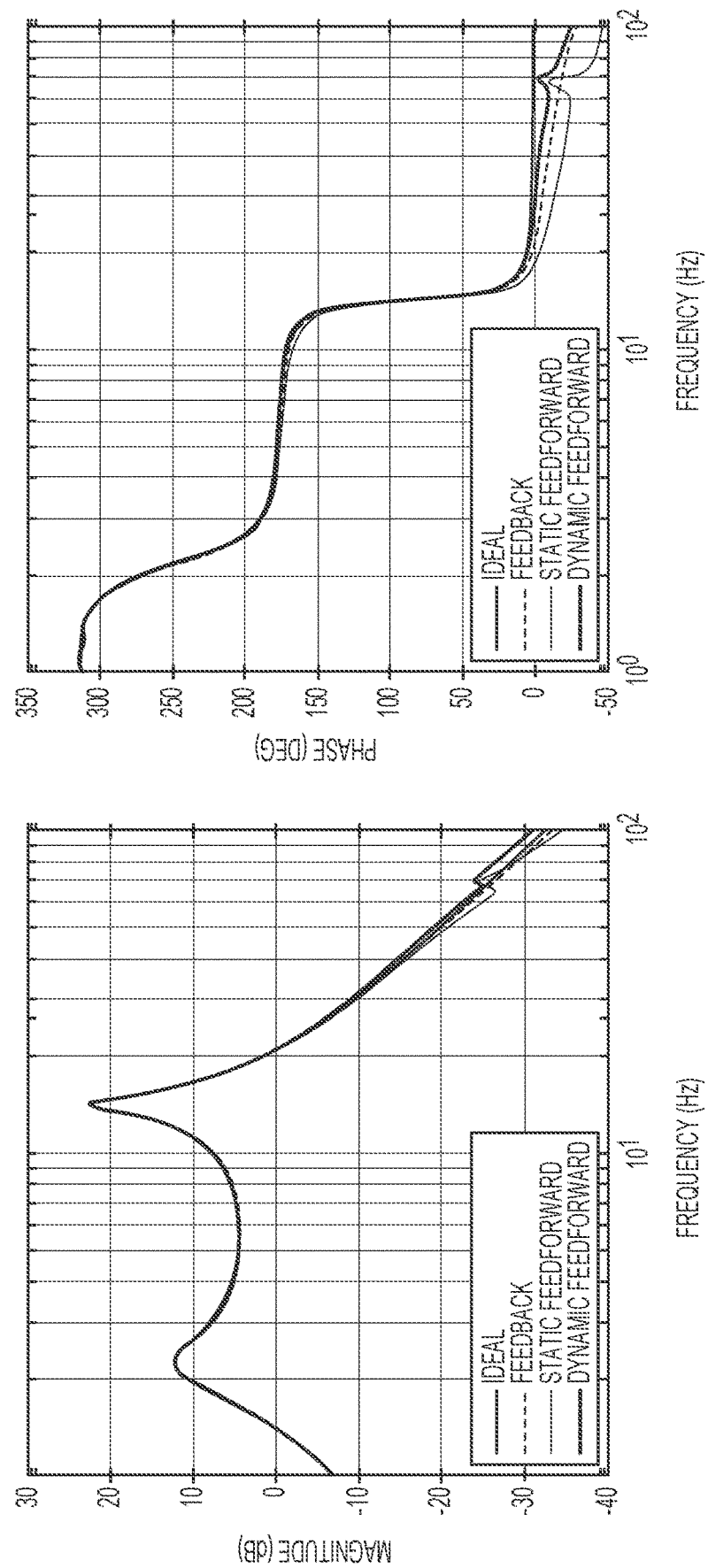
FIG. 10 illustrates comparisons between feedback control and feedforward control of a PMDC motor according to one or more embodiments.

Frequency response comparisons of feedback control (baseline) with the mechanical observer based static and dynamic feedforward current control implementations described herein indicate that the behavior of the post-fault control strategies described herein is satisfactory and comparable to the (baseline) feedback control using measured currents. For example, the frequency responses of open-loop transfer function of the EPS system from input torque command $T_c$ to the handwheel torque $T_{HW}$ shown in FIG. 10 illustrate that the stability margins of the EPS control system are comparable between feedback and feedforward current control architectures of PMDC drives.

The technical solutions described herein thus address the technical challenge of current sensor failures in PMDC machine based systems, such as EPS systems, which can cause the system to shut down. The technical solutions herein facilitates for continued operation of the system after current sensor failures, thus providing enhanced fault tolerance. As described herein, the technical solutions use observer based current control of the PMDC machine using a combination of feedforward and feedback current control. The technical solutions described herein use mechanical and/or composite plant model based observers. The technical solutions described herein further facilitate fault transition management for improving the transition from healthy to faulted mode of operation.

As used above, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in the above Figures may be combined and/or further partitioned.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A power steering system comprising:
a motor; and
a motor control system configured to generate an amount of torque using the motor, the amount of torque corresponding to a torque command, the motor control system comprising a processor; and a memory that includes instructions that, when executed by the processor, cause the processor to:
detect a current sensor fault associated with a current sensor used to measure a current across the motor;
determine, in response to the current sensor fault, a base motor velocity estimate based on the torque command, a handwheel torque, and a handwheel position;
determine a compensated motor velocity estimate based on the base motor velocity estimate and an estimated acceleration that corresponds to the base motor velocity estimate; and
generate a current command for generating the amount of torque using the motor, the current command generated using the compensated motor velocity estimate.

2. The power steering system of claim 1, wherein the instructions, when executed by the processor, further cause the processor to: generate a modified torque command in response to the current sensor fault, a magnitude of the modified torque command changes over a time period.

3. The power steering system of claim 1, wherein the instructions, when executed by the processor, further cause the processor to: generate a modified voltage command in response to the current sensor fault, a magnitude of the modified voltage command changes over a time period based on a scale factor, the modified voltage command indicating a voltage to be applied across the motor.

4. The power steering system of claim 3, wherein the modified voltage command is reduced to a magnitude of zero when the current sensor fault is detected and increases from the magnitude of zero over a time period.

5. The power steering system of claim 1, wherein the instructions, that cause the processor to determine the base motor velocity estimate, cause the processor to: determine the base motor velocity estimate based on a handwheel torque, a handwheel position, and the current command that is generated in response to the torque command.

6. The power steering system of claim 1, wherein the instructions, that cause the processor to determine the base motor velocity estimate, cause the processor to: determine the base motor velocity estimate based on a handwheel torque, a handwheel position, and a previous modified voltage command.

7. The power steering system of claim 1, wherein the instructions, when executed by the processor, further cause the processor to generate a second current command that is used to modify a first current command that is computed in response to the torque command.

8. A method for generating an amount of torque using a motor, the amount of torque corresponding to a torque command, the method comprising:
  detecting a current sensor fault associated with a current sensor used to measure a current across the brush motor;
  determining, in response to the current sensor fault, a base motor velocity estimate based on a handwheel torque, a handwheel position, and a previous modified voltage command;
  determining a compensated motor velocity estimate based on the base motor velocity estimate and an estimated acceleration that corresponds to the base motor velocity estimate; and
  generating a current command for generating the amount of torque using the motor, the current command generated using the compensated motor velocity estimate.

9. The method of claim 8, further comprising: generating a modified torque command in response to the current sensor fault, a magnitude of the modified torque command changes over a time period.

10. The method of claim 8, further comprising:
  responsive to detecting the current sensor fault, generating a modified voltage command based at least in part on the compensated motor velocity estimate and the current command, a magnitude of the modified voltage command changes over a time period, the modified voltage command indicating a voltage to be applied across the motor.

11. The method of claim 10, wherein the modified voltage command is increased from a magnitude of zero when the current sensor fault is detected.

12. A system comprising:
  a motor;
  a motor control system configured to generate an amount of torque using the motor, the amount of torque corresponding to a torque command, the motor control system comprising a processor; and a memory that includes instructions that, when executed by the processor, cause the processor to:
  determine a feedback voltage to be applied across the motor for generating the amount of torque, the feedback voltage determined based on a current across the motor;
  detect a current sensor fault associated with a current sensor used to measure a current across the motor;
  determine a base motor velocity estimate based on the torque command, a handwheel torque, and a handwheel position;
  determine a compensated motor velocity estimate based on the base motor velocity estimate and an estimated acceleration that corresponds to the base motor velocity estimate;
  determine an estimated current across the motor based at least in part on the compensated motor velocity estimate; and
  determine, using the estimated current, the feedback voltage in response to the current sensor fault.

13. The system of claim 12, wherein the instructions, when executed by the processor, further cause the processor to: generate a modified torque command in response to the current sensor fault, a magnitude of the modified torque command changes over a time period.

14. The system of claim 12, wherein the instructions, when executed by the processor, further cause the processor to: generate a modified voltage command based on the feedback voltage, in response to the current sensor fault, a magnitude of the modified voltage command changes over a time period, the modified voltage command indicating the voltage to be applied across the motor.

15. The system of claim 14, wherein the modified voltage command is reduced to a magnitude of zero when the current sensor fault is detected, the modified voltage command is increased from a magnitude of zero over a time period.

16. The power steering system of claim 1, wherein the processor, when determining the compensated motor velocity estimate, is to:
  determine the compensated motor velocity estimate based on the base motor velocity estimate and the estimated acceleration, such that the compensated motor velocity estimate compensates for a phase lag, wherein the phase lag represents a dynamic time-delay.

17. The method of claim 8, wherein determining the compensated motor velocity estimate comprises:
  determining, based on the base motor velocity estimate and the estimated acceleration, the compensated motor velocity estimate such that the compensated motor velocity estimate compensates for a phase lag, wherein the phase lag represents a dynamic time-delay.

18. The system of claim 12, wherein the instructions, that cause the processor to determine the compensated motor velocity estimate, cause the processor to:
  determine, based on the base motor velocity estimate and the estimated acceleration, the compensated motor velocity estimate such that the compensated motor velocity estimate compensates for a phase lag, wherein the phase lag represents a dynamic time-delay.

* * * * *